(12) United States Patent
Zhu et al.

(10) Patent No.: US 9,609,096 B2
(45) Date of Patent: *Mar. 28, 2017

(54) ELECTRONIC DEVICE WITH NFC ANTENNA ADJACENT DISPLAY AND RELATED METHODS

(71) Applicant: BLACKBERRY LIMITED, Waterloo (CA)

(72) Inventors: Lizhong Zhu, Waterloo (CA); Libo Zhu, Waterloo (CA); Scott Leonard Dill, Waterloo (CA); Raymond Michael Dikun, Red Oak, TX (US); Pha Cong Nguyen, Lake Worth, FL (US); Soo Liam Ooi, Plantation, FL (US); Randy Alan Wiessner, Palatine, IL (US)

(73) Assignee: BLACKBERRY LIMITED, Waterloo (CA)

( * ) Notice: Subject to any disclaimer, the term of this patent is extended or adjusted under 35 U.S.C. 154(b) by 6 days.

This patent is subject to a terminal disclaimer.

(21) Appl. No.: 14/164,962

(22) Filed: Jan. 27, 2014

(65) Prior Publication Data

US 2014/0141835 A1    May 22, 2014

Related U.S. Application Data

(63) Continuation of application No. 13/269,054, filed on Oct. 7, 2011, now Pat. No. 8,676,116.

(51) Int. Cl.
*H04B 5/00* (2006.01)
*H04M 1/02* (2006.01)
(Continued)

(52) U.S. Cl.
CPC ............ *H04M 1/026* (2013.01); *H01Q 1/243* (2013.01); *H01Q 7/00* (2013.01); *H01Q 21/28* (2013.01);
(Continued)

(58) Field of Classification Search
CPC .................................... H04B 5/00; H04B 5/02
(Continued)

(56) References Cited

U.S. PATENT DOCUMENTS 7,202,825 B2    4/2007    Leizerovich et al.
7,825,860 B2   11/2010    Ying
(Continued)

FOREIGN PATENT DOCUMENTS

EP        2660988 A1    11/2013

OTHER PUBLICATIONS

Michaluk, "A Closer Look at the NFC antenna battery door on the BlackBerry Bold 9900 (and reasoning why the new Torches do not have NFC)," Aug. 2011, pp. 1-3.
(Continued)

*Primary Examiner* — April G Gonzales
(74) *Attorney, Agent, or Firm* — Guntin & Gust, PLC; Ralph Trementozzi

(57) ABSTRACT

An electronic device may include a housing having a display opening therein, processing circuitry within the housing, and wireless transceiver circuitry within the housing and coupled to the processing circuitry. The electronic device may also include NFC transceiver circuitry within the housing and coupled to the processing circuitry, a display within the housing and coupled to the processing circuitry, the display having an external surface exposed through the display opening and having an internal surface within the housing, and an NFC antenna positioned within the housing behind and aligned with the internal surface of the display and coupled to the NFC transceiver circuitry.

24 Claims, 6 Drawing Sheets

(51) Int. Cl.
*H01Q 1/24* (2006.01)
*H01Q 7/00* (2006.01)
*H01Q 21/28* (2006.01)

(52) U.S. Cl.
CPC ......... *H04B 5/0081* (2013.01); *H04M 1/0266* (2013.01); *H04M 2250/04* (2013.01); *H04M 2250/22* (2013.01); *Y10T 29/49018* (2015.01)

(58) Field of Classification Search
USPC ....................................... 455/41.1, 90.3, 566
See application file for complete search history.

(56) References Cited

U.S. PATENT DOCUMENTS

| | | | |
|---|---|---|---|
| 7,917,115 | B2 | 3/2011 | Baker |
| 7,973,722 | B1* | 7/2011 | Hill .......................... H01Q 7/08 343/702 |
| 8,676,116 | B2* | 3/2014 | Zhu ...................... H04B 5/0081 455/41.1 |
| 2002/0036593 | A1 | 3/2002 | Ying et al. |
| 2008/0081631 | A1 | 4/2008 | Rofougaran |
| 2010/0315389 | A1* | 12/2010 | Sorrell ..................... H01Q 1/22 345/204 |
| 2011/0070829 | A1* | 3/2011 | Griffin ..................... H04B 5/02 455/41.1 |
| 2011/0111719 | A1 | 5/2011 | Man et al. |
| 2011/0111720 | A1 | 5/2011 | Man et al. |
| 2011/0111814 | A1 | 5/2011 | Man et al. |
| 2013/0090058 | A1* | 4/2013 | Zhu .......................... H04M 1/03 455/41.1 |
| 2013/0162594 | A1* | 6/2013 | Paulsen .................. G06F 3/044 345/174 |
| 2013/0177455 | A1* | 7/2013 | Kamen ............... G06F 19/3418 417/313 |
| 2014/0011447 | A1* | 1/2014 | Konanur .................. H04B 5/00 455/41.1 |
| 2014/0087654 | A1* | 3/2014 | Kiveisha .............. H04B 5/0031 455/41.1 |
| 2014/0176371 | A1* | 6/2014 | Liao ....................... G06F 1/1626 343/702 |
| 2014/0179224 | A1* | 6/2014 | Liao ....................... H01Q 1/273 455/41.1 |
| 2014/0179242 | A1* | 6/2014 | Liao ....................... H04W 4/008 455/90.1 |
| 2014/0273858 | A1* | 9/2014 | Panther ................ A61B 5/0002 455/41.2 |

OTHER PUBLICATIONS

"BlackBerry PlayBook Teardown," iFixit, Apr. 2011, pp. 1-5.

* cited by examiner

ELECTRONIC DEVICE WITH NFC ANTENNA ADJACENT DISPLAY AND RELATED METHODS

CROSS-REFERENCE TO RELATED APPLICATIONS

This application is a continuation of and claims priority to U.S. patent application Ser. No. 13/269,054 (now U.S. Pat. No. 8,676,116), filed Oct. 7, 2011, which is incorporated herein by reference in its entirety.

FIELD OF THE INVENTION

The present invention relates to the field of wireless communications, and, more particularly, to mobile wireless communications and related methods.

BACKGROUND OF THE INVENTION

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

In some mobile applications where size and packaging are limited, it may be difficult to place an NFC antenna effectively since the typical NFC antenna relies on magnetic induction. In particular, other nearby components may cause interference and reduce the operational efficiency of the NFC antenna.

DETAILED DESCRIPTION OF THE PREFERRED EMBODIMENTS

Figure 1:
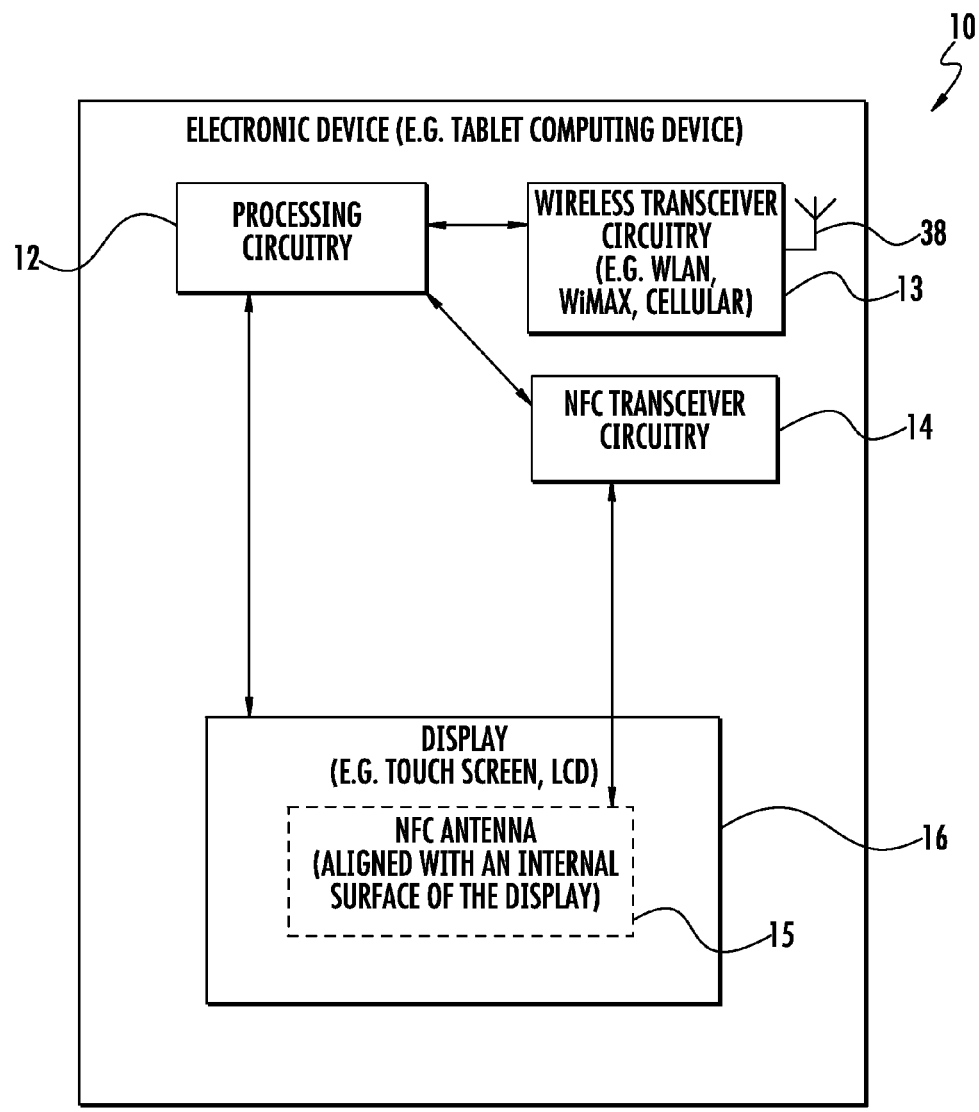
FIG. 1 is a schematic diagram of an electronic device, according to the present disclosure.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Generally speaking, an electronic device, for example, a tablet computer or a mobile phone device, may include a housing having a display opening therein, processing circuitry within the housing, and wireless transceiver circuitry within the housing and coupled to the processing circuitry. The electronic device may also include NFC transceiver circuitry within the housing and coupled to the processing circuitry, and a display within the housing and coupled to the processing circuitry. The display may have an external surface exposed through the display opening and have an internal surface within the housing. The electronic device also may include an NFC antenna positioned within the housing behind and aligned with the internal surface of the display and coupled to the NFC transceiver circuitry.

More specifically, the NFC antenna may comprise a substrate and electrically conductive traces thereon defining a plurality of loops. The substrate may have a rectangular shape, the plurality of loops being adjacent a periphery of the substrate.

The electronic device may further comprise a flexible circuit coupling the NFC antenna to the NFC transceiver circuitry. For example, the substrate may comprise a ferrite layer. The electronic device may further comprise a frame within the housing and behind the internal surface of the display, and the NFC antenna may be mounted on the frame.

In other embodiments, the NFC antenna may be mounted to the internal surface of the display. The display may comprise a touch screen display, for example. The wireless transceiver circuitry may comprise at least one of cellular transceiver circuitry, WiMAX transceiver circuitry, and wireless local area network (WLAN) transceiver circuitry. In some embodiments, the processing circuitry may comprise tablet computer processing circuitry.

Another aspect is directed to a method of making an electronic device. The method may comprise forming a housing having a display opening therein, coupling processing circuitry within the housing, and coupling wireless transceiver circuitry within the housing and to the processing circuitry. The method may further comprise coupling NFC transceiver circuitry within the housing and to the processing circuitry, and coupling a display within the housing and to the processing circuitry. The display may have an external surface exposed through the display opening and an internal surface within the housing. The method also may comprise positioning an NFC antenna within the housing behind and aligned with the internal surface of the display, and coupling the NFC antenna to the NFC transceiver circuitry.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Referring now to FIG. 1, an electronic device 10 according to the present disclosure is now described. The electronic device 10 illustratively includes a housing 11 having a display opening therein, processing circuitry 12 within the housing, and wireless transceiver circuitry 13 within the housing and coupled to the processing circuitry. The electronic device 10 illustratively includes an antenna 38 coupled to the wireless transceiver circuitry 13. For example, the wireless transceiver circuitry 13 may comprise at least one of cellular transceiver circuitry, WiMAX transceiver circuitry, and WLAN transceiver circuitry. The electronic device 10 illustratively includes NFC transceiver circuitry 14 within the housing 11 and coupled to the processing circuitry 12, and a display 16 within the housing and coupled to the processing circuitry.

The display 16 illustratively includes an external surface exposed through the display opening and an internal surface within the housing 11. In some embodiments, the display 16 may include a touch screen with a user input surface facing outward though the display opening. The electronic device 10 illustratively includes an NFC antenna 15 (shown with dashed lines in FIG. 1) positioned within the housing 11 behind and aligned with the internal surface (i.e. external surface) of the display 16 and coupled to the NFC transceiver circuitry 14.

Figure 5:
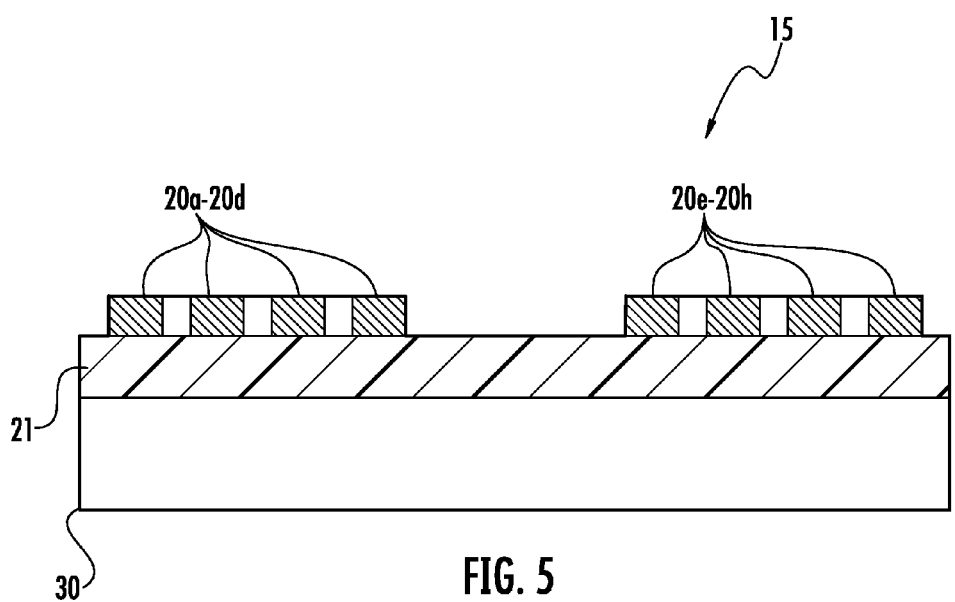
FIG. 5 is a cross-sectional view along line 5-5 of the NFC antenna from the display of FIG. 2.

Referring now briefly and additionally to FIG. 5, the NFC antenna 15 illustratively includes a backing layer 30, a substrate 21 on the backing layer, and electrically conductive traces 20a-20h thereon defining a plurality of loops. The substrate 21 illustratively includes a rectangular shape, the plurality of loops being adjacent a periphery of the substrate. The backing layer 30 may comprise ferrite and may provide some inductive shielding for the NFC antenna 15.

Figure 2:
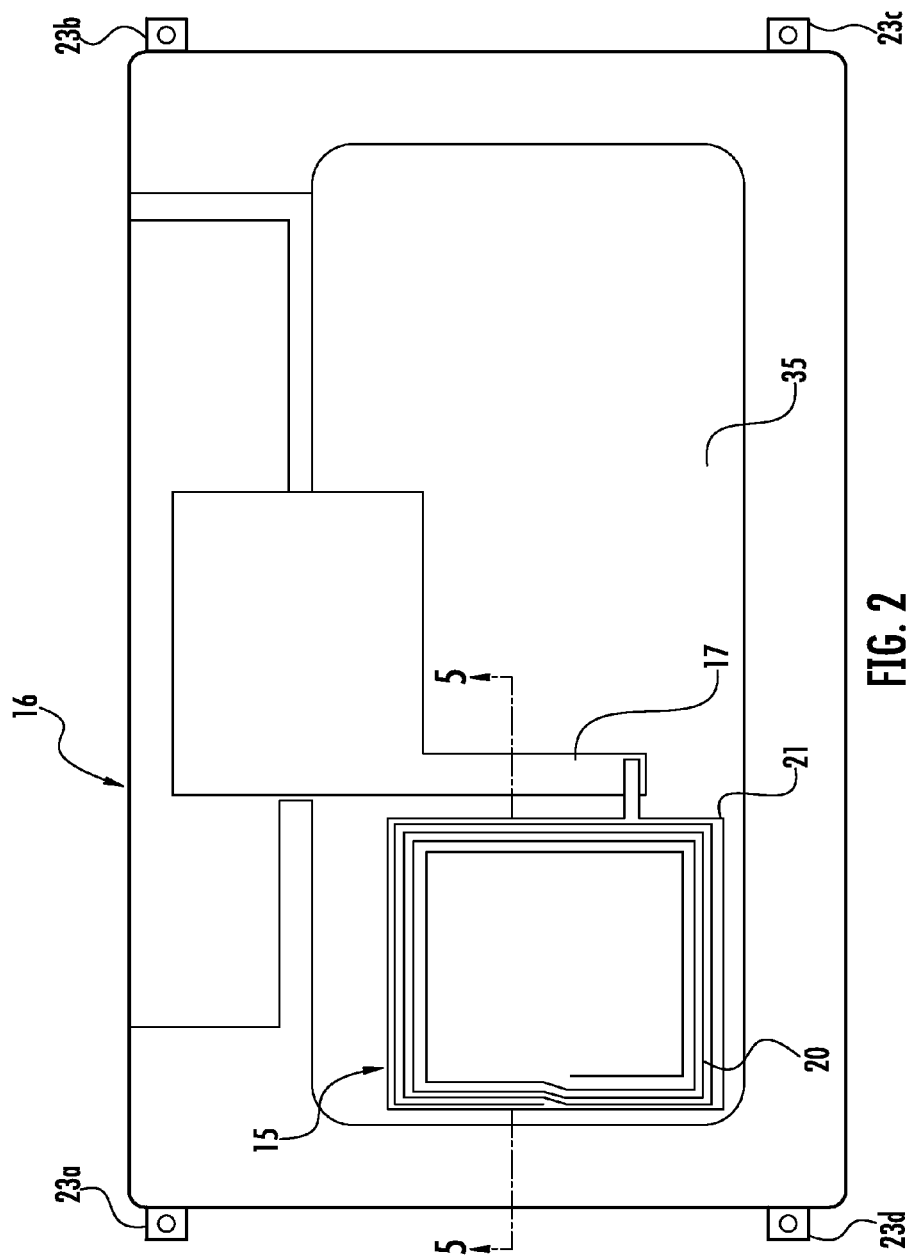
FIG. 2 is a top side view of an example embodiment of the display from the electronic device of FIG. 1.

Referring now additionally to FIG. 2, the display 16 illustratively includes an internal surface 35. The NFC antenna 15 is directly mounted on the internal surface 35. The electronic device 10 illustratively includes a flexible circuit 17 coupling the NFC antenna 15 to the NFC transceiver circuitry. The display 16 illustratively includes a plurality of foot portions 23a-23d for coupling to the housing 11. As will be appreciated by those skilled in the art, fastening devices, such as screws, can be used to secure the display 16 to the housing 11.

Figure 3:
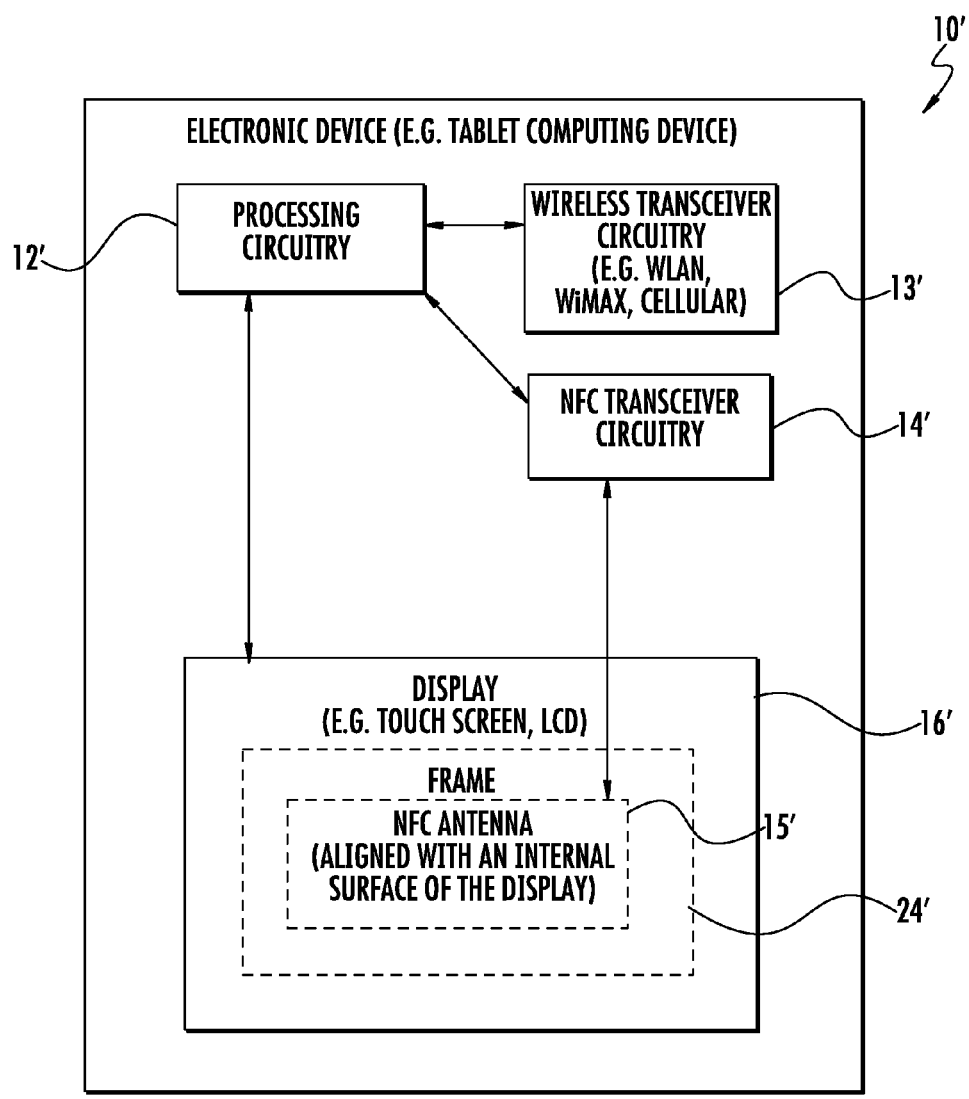
FIG. 3 is a schematic diagram of another embodiment of the electronic device, according to the present disclosure.
Figure 4:
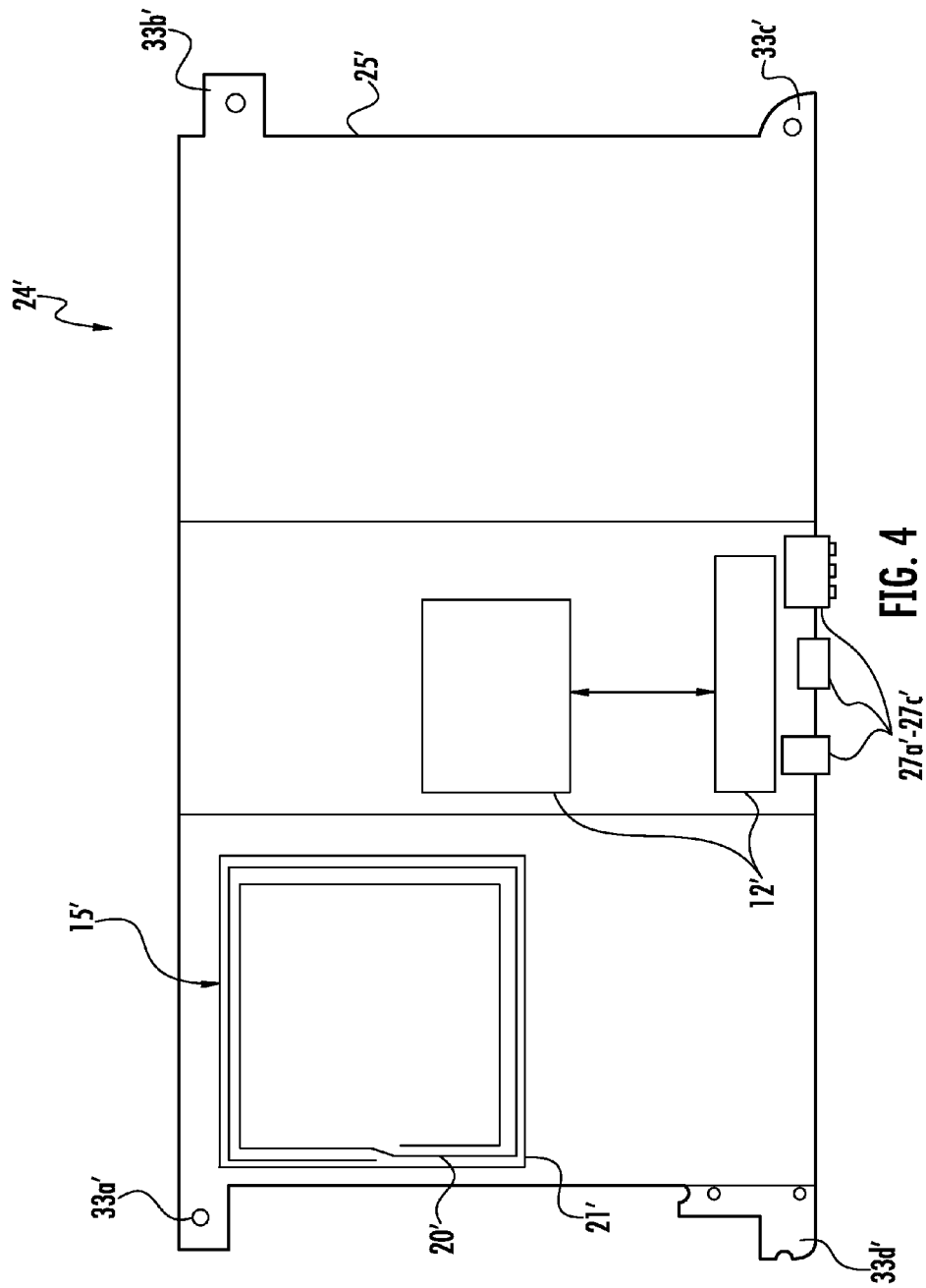
FIG. 4 is a top side view of an example embodiment of the frame from the electronic device of FIG. 3.

Referring now to FIGS. 3-4, another embodiment of the electronic device 10' is now described. In this embodiment of the electronic device 10', those elements already discussed above with respect to FIGS. 1-2 are given prime notation and most require no further discussion herein. This embodiment differs from the previous embodiment in that the electronic device 10' illustratively includes a frame 24' (shown with dashed lines in FIG. 3) within the housing 11' and behind the internal surface of the display 16'. The NFC antenna 15' is mounted on the frame 24', which is fastened to the display 16'. In particular, the frame 24' illustratively includes a plurality of foot portions 33a'-33d' for coupling to the display 11'. The frame 24' also illustratively includes a plurality of connectors 27a'-27c' for permitting external connections to the electronic device 10'.

Advantageously, the positioning of the NFC antenna 15 provides for improved performance, as noted in Table 1. In particular, the NFC antenna 15 of the present application provides improved reading range. In typical applications, the LCD and touch screen (especially LCD) could significantly reduce the quality factor Q of an NFC antenna. This may drastically cause the degradation of the required magnetic field strength to allow proper reader and card modes of operations. By optimizing the size of NFC antenna 15 (e.g. 50 mm×42 mm.), number of turns of the antenna, and physical dimensions of the antenna, etc., the "best" trade-off of antenna Q and inductance is obtained, in order to achieve better operating volume of both NFC reader and card emulation modes. Also, by proper selecting ferrite sheet (backing layer 30), i.e., size, thickness, electrical characteristics, etc., the metal influence on the back of NFC antenna may be reduced to achieve the best Q factor and inductance of the NFC antenna 15. Table 1 highlights the reader and card emulation modes of operation of 2-turn NFC antenna 15.

TABLE 1

| Reading Range (mm) | | | | | |
|---|---|---|---|---|---|
| Tag Types | Tag Names | Protocol | FormFactor | 2 turns (NO. 1) | 2 turns (NO. 2) |
| Type 1 | Topaz | ISO 14443 A-2 | IDl 96b Square 96b IDl 512b | 25 18 18 | 25 22 20 |
| Type 2 | Mifare Ultralight | ISO 14443 A-3 | IDl Circular ø2.5 | 15 11 | 14 10 |
| Type 5 | Picopass | ISO 14443 B-3 | Square 4.5 cm IDl | 20 14 | 21 13 |
| Type 3 | Felica Icode | Felica 15-3 | IDl IDl | 27 38 | 26 37 |

| Detection Range (mm) | | |
|---|---|---|
| | 2 turns (NO. 1) | 2 turns (NO. 2) |
| Vivotech 5000 reader ON | 30 | 32 |
| OFF | 18 | 17 |

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
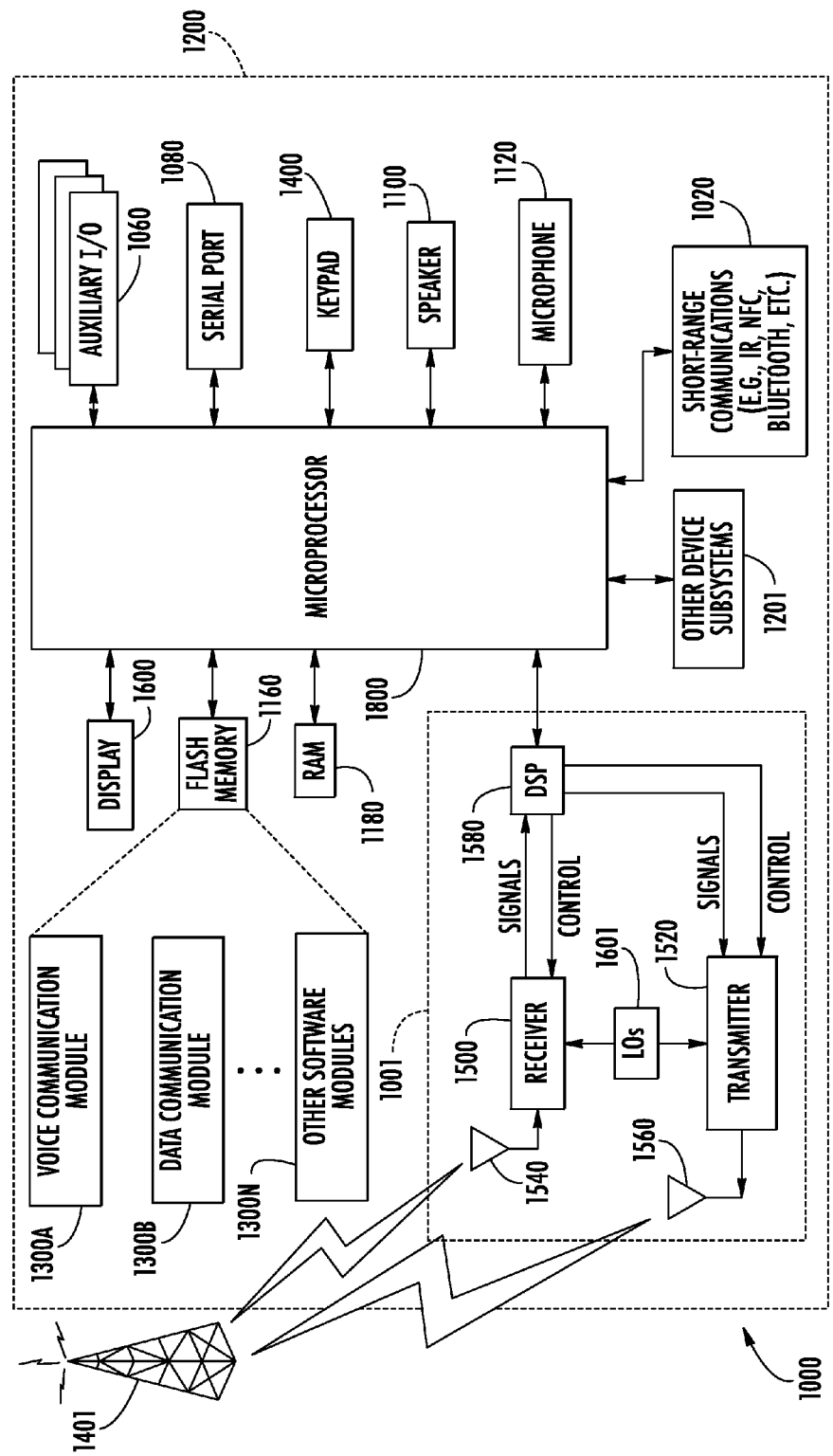
FIG. 6 is a schematic block diagram illustrating example components of a mobile wireless communications device that may be used with the electronic device of FIG. 1.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:
1. An electronic device comprising:
a housing;
at least one wireless transceiver carried by the housing;
a near field communications (NFC) device carried by the housing;

a display carried by the housing and having an internal surface within the housing and a display surface opposite the internal surface; and an NFC antenna extending across at least a portion of the internal surface of the display, wherein the NFC antenna is mounted on the internal surface of the display and coupled to the NFC device.

2. The electronic device of claim 1 wherein the NFC antenna comprises a backing layer, a substrate on the backing layer and electrically conductive traces thereon defining a plurality of loops.

3. The electronic device of claim 2 wherein the substrate has a rectangular shape, wherein the backing layer comprises an inductive shield that shields the NFC antenna, and wherein the plurality of loops is adjacent a periphery of the substrate.

4. The electronic device of claim 2 wherein the substrate comprises a ferrite layer.

5. The electronic device of claim 1 further comprising a flexible circuit coupling the NFC antenna to the NFC device.

6. The electronic device of claim 1 further comprising a frame carried by the housing behind the internal surface of the display, wherein the frame is fastened to the display, and wherein the NFC antenna is mounted on the frame.

7. The electronic device of claim 1 wherein the NFC antenna is mounted directly to the internal surface of the display.

8. The electronic device of claim 1 wherein the display comprises a touch screen display.

9. The electronic device of claim 1 wherein the at least one wireless transceiver comprises at least one of a cellular transceiver, a WiMAX transceiver, and a wireless local area network (WLAN) transceiver.

10. The electronic device of claim 1 further comprising tablet computer processing circuitry carried by the housing and coupled to the at least one wireless transceiver.

11. A tablet computing device comprising:
a housing;
tablet computing circuitry carried by the housing;
at least one wireless transceiver carried by the housing and coupled to the tablet computing circuitry;
a near field communications (NFC) device carried by the housing and coupled to the tablet computing circuitry;
a display carried by the housing and coupled to the tablet computing circuitry, the display having an internal surface within the housing and a display surface opposite the internal surface;
an NFC antenna extending across at least a portion of the internal surface of the display, wherein the NFC antenna is mounted on the internal surface of the display; and a flexible circuit coupling the NFC antenna to the NFC device.

12. The tablet computing device of claim 11 wherein the NFC antenna comprises a substrate and electrically conductive traces thereon defining a plurality of loops.

13. The tablet computing device of claim 12 wherein the substrate comprises a ferrite layer.

14. The tablet computing device of claim 11 further comprising a frame within the housing behind the internal surface of the display, wherein the frame comprises a plurality of foot portions that couple the frame to the display, and wherein the NFC antenna is mounted on the frame.

15. The tablet computing device of claim 11 wherein the NFC antenna is mounted to the internal surface of the display.

16. The tablet computing device of claim 11 wherein the display comprises a touch screen display.

17. The tablet computing device of claim 11 wherein the at least one wireless transceiver comprises at least one of a cellular transceiver, a WiMAX transceiver, and a wireless local area network (WLAN) transceiver.

18. A method of making an electronic device comprising:
mounting at least one wireless transceiver within a housing;
mounting a near field communications (NFC) device within the housing;
mounting a display to the housing, the display having an internal surface within the housing and a display surface opposite the internal surface; and
mounting an NFC antenna to the internal surface of the display within the housing, wherein the NFC antenna extends across at least a portion of the internal surface of the display.

19. The method of claim 18 wherein the NFC antenna comprises a substrate and electrically conductive traces thereon defining a plurality of loops.

20. The method of claim 19 wherein the substrate has a rectangular shape and wherein the plurality of loops is adjacent a periphery of the substrate.

21. The method of claim 19 wherein the substrate comprises a ferrite layer.

22. The method of claim 18 further comprising coupling a flexible circuit between the NFC antenna and the NFC device.

23. The method of claim 18 further comprising mounting a frame within the housing and behind the internal surface of the display; and wherein mounting the NFC antenna comprises mounting the NFC antenna on the frame.

24. The method of claim 18 wherein mounting the NFC antenna comprises mounting the NFC antenna to the internal surface of the display.

* * * * *